(12) United States Patent
Namuduri et al.

(10) Patent No.: US 7,786,687 B2
(45) Date of Patent: Aug. 31, 2010

(54) APPARATUS AND METHOD FOR CONTROL OF AN ACTIVE FRONT STEERING (AFS) SYSTEM

(75) Inventors: Chandra S. Namuduri, Troy, MI (US); Suresh Gopalakrishnan, Farmington Hills, MI (US); Robert R. Bolio, Clarkston, MI (US); Ross Feller, Ann Arbor, MI (US); Balarama V. Murty, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 328 days.

(21) Appl. No.: 12/109,676

(22) Filed: Apr. 25, 2008

(65) Prior Publication Data

US 2009/0269043 A1 Oct. 29, 2009

(51) Int. Cl.
*H02P 1/04* (2006.01)
*H02P 6/04* (2006.01)

(52) U.S. Cl. ............ 318/400.09; 318/245; 318/400.11; 318/599; 318/811

(58) Field of Classification Search ............ 318/400.09, 318/272, 245, 599, 696, 400.11, 811
See application file for complete search history.

(56) References Cited

U.S. PATENT DOCUMENTS

| | | | | |
|---|---|---|---|---|
| 5,001,410 A | * | 3/1991 | Ono | 318/696 |
| 5,196,777 A | * | 3/1993 | Kataoka | 318/696 |
| 5,569,994 A | * | 10/1996 | Taylor et al. | 318/700 |
| 6,549,835 B2 | * | 4/2003 | Deguchi et al. | 701/41 |
| 7,308,192 B2 | * | 12/2007 | Williams et al. | 388/819 |
| 7,612,522 B2 | * | 11/2009 | Williams et al. | 318/819 |
| 2002/0038171 A1 | * | 3/2002 | Deguchi et al. | 701/41 |
| 2004/0017170 A1 | * | 1/2004 | Endo et al. | 318/272 |
| 2005/0226607 A1 | * | 10/2005 | Williams et al. | 388/819 |

* cited by examiner

*Primary Examiner*—Paul Ip
(74) *Attorney, Agent, or Firm*—John A. Miller; Miller IP Group, PLC

(57) ABSTRACT

A motor control strategy for a motor in a front steering system for a vehicle that reduces vibrations from the motor being transferred to a vehicle hand-wheel. The control strategy also includes operating the electric motor in a commutation freeze mode if a position error signal is less than a first predetermined threshold by sending signals to coils of the motor to prevent to the motor from rotating, operating the electric motor in a commutation normal mode if the position error signal is greater than a second predetermined threshold that is greater than the first predetermined threshold, and operating the electric motor in an angle step mode if the position error signal is between an intermediate threshold and the second threshold where the angle step mode provides a signal to the motor to move the motor forward or backward a predetermined number of motor steps, one step at a time.

20 Claims, 8 Drawing Sheets

APPARATUS AND METHOD FOR CONTROL OF AN ACTIVE FRONT STEERING (AFS) SYSTEM

BACKGROUND OF THE INVENTION

1. Field of the Invention

This invention relates generally to a motor control strategy and, more particularly, to a motor control strategy for a motor in an active front steering system for a vehicle that prevents torque ripple from being coupled to the hand-wheel of the vehicle.

2. Discussion of the Related Art

Hydraulic power assist steering systems for vehicles typically employ a hydraulic pump coupled to a hydraulic steering gear of the vehicle. The direction and magnitude of the power assist provided by the steering system is determined by a valve that is actuated by a torsion bar provided between the steering hand-wheel and the fixed end of the steering valve. Steering system connections in a conventional automotive vehicle are typically provided by direct mechanical linkages between a steering device and the front wheels of the vehicle. For example, in a rack and pinion steering system the rotation of the steering wheel rotates a pinion gear which is engaged with mating notches or teeth in a rack portion of the steering system. Tie rods connect the rack portion to the wheels, so that any rotational motion of the steering wheel ultimately rotates the road wheels to a resultant steering angle, which may vary depending on the steering ratio provided by the steering system. Other steering linkage designs may be used instead of a rack and pinion design, such as worm gears used in a re-circulating ball steering system. In either example, however, all control linkages are purely mechanical in nature.

In a by-wire steering system, an electronically controlled steering actuator, typically a brushless DC permanent magnet synchronous motor, is positioned on or in proximity to the front drive axle, and one or more transducers or other sensors measure or detect the steering request or input to a steering device, usually configured as a steering wheel. The sensors can measure a steering angle at the steering device, and/or a rotational force or torque applied to the steering device by an operator of the vehicle. The input signals representing these measured or detected values are then transmitted electrically to a steering actuator, which executes a steering maneuver in response to the signals. A by-wire steering system can be configured as a limited by-wire system in which a conventional mechanical steering linkage is retained, and in which an electronic steering signal is selectively used to augment or modify a steering response in the steering system. That is, if the motor is commanded with a positive or negative steering command, the commanded angle is added to or subtracted from the rotation of the hand-wheel after being reduced by an appropriate gear ratio, and is applied to the pinion gear.

Known controllers for the brushless DC motor driven AFS systems typically utilize commutation logic for the three motor phases based on three position sensors spaced apart at 60° or 120° electrical. The motor phases are switched whenever a transition of a position sensor is detected. Alternatively, the motor phases can be detected using a high resolution encoder. The motor phases typically have trapezoidal induced voltages and are controlled by applying rectangular current signals of 120° duration. The closed loop position control typically utilizes a proportional-integral-derivative (PID) control to determine the magnitude and phase of the motor command. Alternatively, the closed loop position control can be determined by proportional-derivative (PD) or proportional-integral (PI) control. U.S. patent application Ser. No. 11/560,876, titled Methods and Apparatus for an Active Front Steering Actuator, filed Nov. 17, 2006, assigned to the assignee of this Application and herein incorporated by reference, discloses a system where the motor command is determined by PID control when the angle error is above a predetermined maximum value and a hold mode when the angle error is less than a predetermined minimum value.

This process works well when the target angle is constant. However, any significant change in the target angle requires a transition to PID control. Transitions between a hold mode and a PID control mode create discontinuities in the PWM duty cycle command from the controller and cause torque disturbances, ripples and oscillations on the hand-wheel. These discontinuities are the result of one phase of the motor turning off at the same time that another phase of the motor was turning on, where there was an overlap of the on signals of the phases as a result of the trapezoidal shaped voltage signal and discontinuities in the rectangular shaped current signal. Each time there is a transition from one phase to another phase in the motor, there is a corresponding dip or ripple in the amount or torque produced by the motor, which is transferred through the steering column as a pulse. This problem cannot be easily resolved by calibration.

SUMMARY OF THE INVENTION

In accordance with the teachings of the present invention, a motor control strategy is disclosed that has a non-limiting application for a motor in an active front steering system for a vehicle that reduces hand wheel vibrations due to motor torque disturbances during commutation. The control strategy includes providing position signals of the actual position of the motor, providing a commanded position signal of a desired position of the motor, and determining a position error signal between the commanded position signal and the actual position signals. The control strategy also includes operating the electric motor in a hold mode if the absolute value of the position error signal is less than a first predetermined threshold by sending signals to coils of the motor to prevent the motor from rotating, operating the electric motor in a commutation normal mode if the absolute value of the position error signal is greater than a second predetermined threshold that is greater than the first predetermined threshold, and operating the electric motor in an angle step mode if the absolute value of the position error signal is between the first and second thresholds, where the angle step mode provides a signal to the motor to move the motor forward or backward a predetermined number of motor steps.

Additional features of the present invention will become apparent from the following description and appended claims taken in conjunction with the accompanying drawings.

DETAILED DESCRIPTION OF THE EMBODIMENTS

Figure 1:
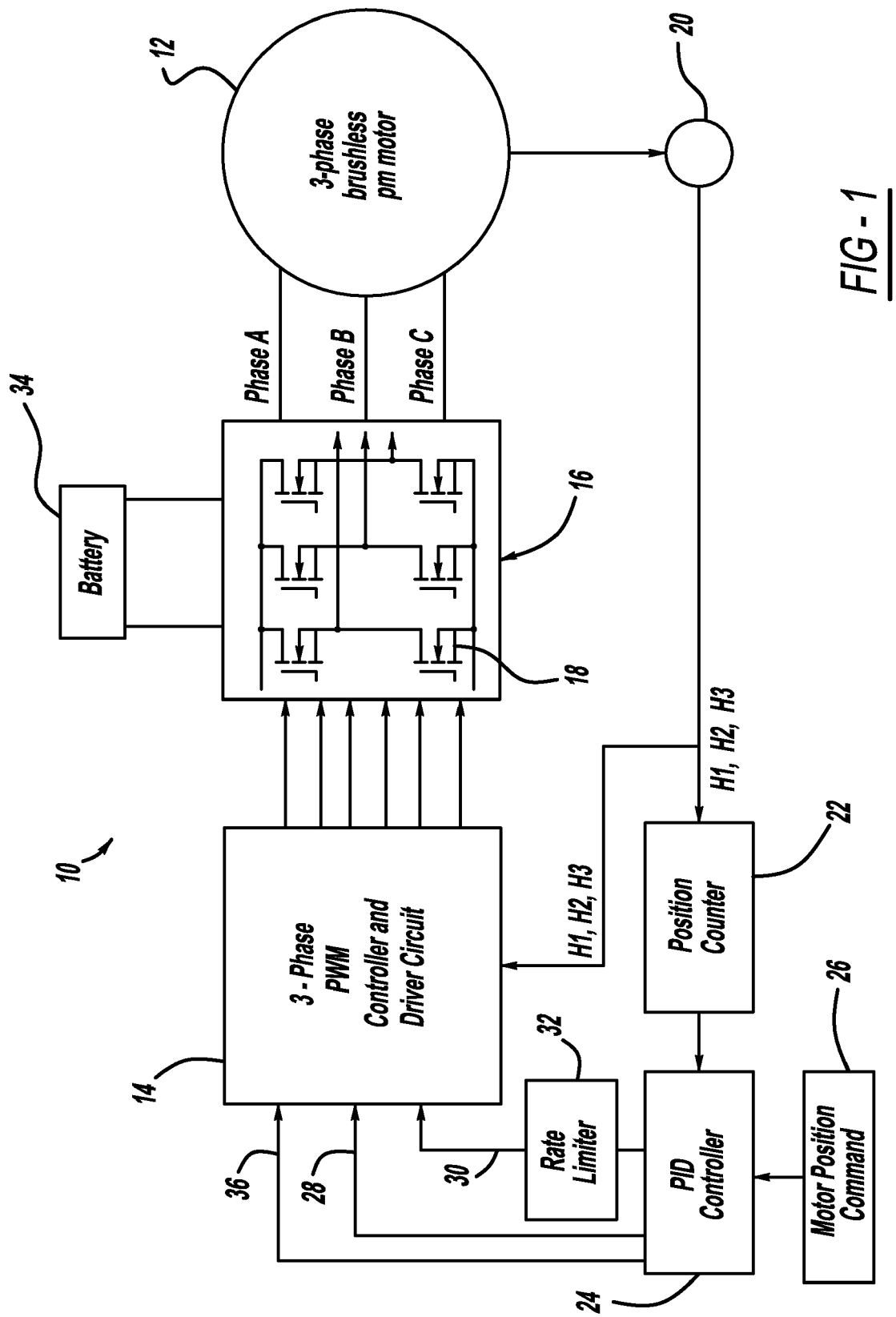
FIG. 1 is a schematic block diagram of an active front steering system, according to an embodiment of the present invention.

The following discussion of the embodiments of the invention directed to a system and method for controlling an electric motor in an active front steering system to reduce hand-wheel vibrations is merely exemplary in nature, and is in no way intended to limit the invention or its applications or uses. For example, the system and method for controlling a motor of the invention as particular application for an electric motor in an active front steering system to reduce hand-wheel vibrations. However, as will be appreciated by those skilled in the art, the control scheme of the invention will have application for other motors in other systems, including non-vehicle systems.

As will be discussed in detail below, the present invention is a control scheme for controlling a brushless electric motor in an AFS system so that motor oscillations are prevented thereby eliminating the vibrations from the motor to the hand-wheel of the vehicle. In general, the control scheme for the motor commutation logic in a motor controller enters a hold mode when a position error between a motor position command and a sensed motor position is less than a predetermined minimum value $\theta_1$. During the hold mode, the motor commutation is frozen where a hold torque is generated by a predetermined voltage across selected motor phases to prevent the motor from rotating.

While in the hold mode, if the position error exceeds a predetermined intermediate value $\theta_3$, the controller enters the angle step mode where the rotor is moved either forward or reverse one commutation step at a time depending on the sign of the angle error. In the angle step mode of operation, a PWM duty cycle is kept fixed. Once the position error falls below the intermediate value $\theta_3$, the controller enters the hold mode. If the angle error exceeds a predetermined maximum value $\theta_2$, the controller enters the PID mode of operation.

More particularly described, an AFS controller determines the instantaneous motor position error based on a motor position command and a motor position counter value, and outputs a PWM duty cycle signal for the voltage to be applied to the motor phases to reduce this error. A PID function is used on the position error to drive the error to zero in steady-state. The PWM voltages applied to the appropriate motor phases based on three motor position sensor signals H1, H2 and H3, and the direction of rotation using a three-phase controller and driver circuit that controls inverter MOSFET power switches. When the error is significantly large, the motor phases are commutated in synchronization with the rotor angle. Once the position error is within the minimum value $\theta_1$, the commutation of the motor phases is frozen corresponding to the position indicated by the position sensor signals H1, H2 and H3. A voltage with a fixed PWM duty cycle is applied to the two or three phases to provide a sufficient hold torque that prevents further motor movement. If the position error exceeds the intermediate value $\theta_3$, the controller enters angle step mode whereby the rotor is moved one commutation step at a time using a fixed duty cycle. The controller enters the hold mode when the angle error falls below the value $\theta_3$, or enters the PID mode when the angle error exceeds the maximum value $\theta_2$. A rate limit on the PWM duty cycle during transition between the angle step and commutation enable (PID) modes can be applied to further minimize any undesirable hand-wheel vibrations.

FIG. 1 is a schematic block diagram of an AFS system 10 including a three-phase brushless PM motor 12. A three-phase pulse-width modulation (PWM) controller and driver circuit 14 provides control signals to a three-phase inverter circuit 16 that cause MOSFET switches 18 to be switched on and off to control stator windings in the motor 12 to control the phase currents of the motor 12 in a manner that is well understood to those skilled in the art. The position of the rotor poles with respect to the stator coils in the motor 12 is sensed by position sensors 20 that provide the edges of the position signals H1, H2 and H3 of the position of the coils relative to the rotor in the motor 12 to a position counter 22. In one embodiment, the position sensors 20 are spaced at 60° electrical apart. As the motor 12 rotates, the edges of the position signals H1, H2 and H3 are counted by the counter 22, where the count is provided to a PID controller 24. The position signals H1, H2 and H3 are also provided to the controller and driver circuit 14. In an alternate embodiment, the three position sensors can be replaced by a high resolution encoder sensor used to determine the position of the rotor poles relative to the stator coils for input to the PWM controller 14 and the actual motor position for input to the PID controller 24. Additionally, a motor position command signal from a command processor 26 is provided to the PID controller 24. The PWM duty cycle signal from the PID controller 24 is then sent to a rate limiter 32 that reduces or limits how fast the duty cycle signal can change for smooth operation.

As will be discussed in detail below, the PID controller 24 provides a control signal to the controller and driver circuit 14 depending on the difference between the actual motor position provided by the position sensor and the desired motor position provided by the command signal. Particularly, the PID controller 24 will provide a commutation hold signal on line 28 that causes the controller and driver circuit 14 to hold the position of the motor 12 if the position error signal is less than a predetermined minimum value, will provide normal PID control on line 30 if the position error signal exceeds a predetermined maximum value, and will provide stepped motor rotation on line 36 if the position error signal is between an intermediate and maximum values. Thus, by holding the rotor when the error signal is below the minimum value, switching between the phases is prevented when the position of the coils is such that switching between the phases would cause a torque dip or ripple. Further, the angle step mode prevents the torque disturbance that would occur between transitioning of the phases when the control scheme is coming out of the hold mode and is entering the PID mode of operation. When the control is in the angle step mode, control of the phases of the motor 12 provides a gradual change in the position of the motor 12 so that the motor 12 does not cause significant torque disturbances.

Figure 2:
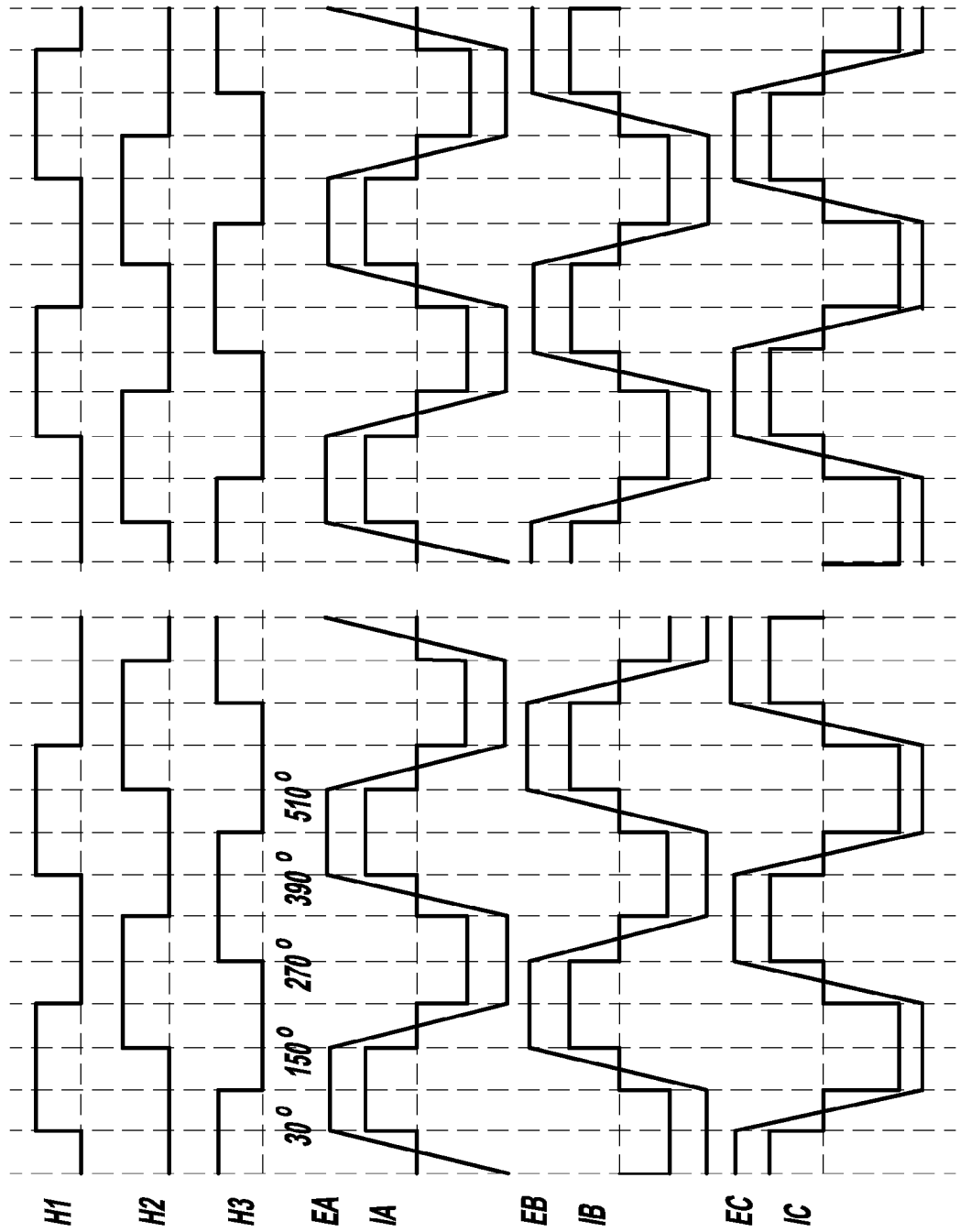
FIG. 2 is a graph with time on the horizontal axis and amplitude on the vertical axis showing control signals for the AFS system shown in FIG. 1.

FIG. 2 is a graph with time on the horizontal axis and amplitude on the vertical axis showing the relative orientation of the position signals H1, H2 and H3, back EMF signals EA, EB and EC for the three motor phases and the phase current signals IA, IB and IC for the three motor phases. Forward motoring is provided on the left side of the graph and reverse motoring is provided on the right side of the graph. The distance between the vertical lines is 60° electrical.

Figure 3:
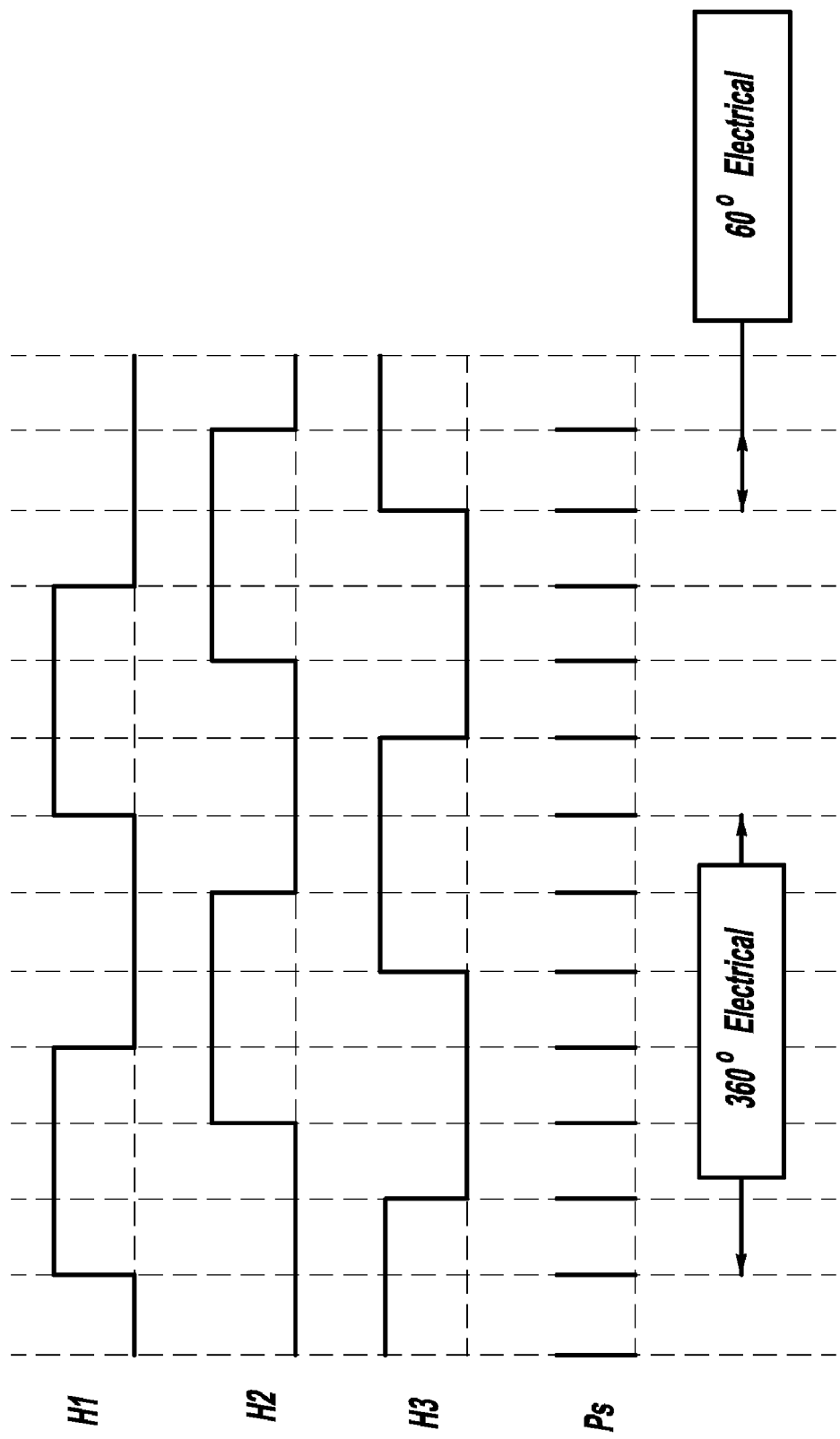
FIG. 3 is a graph with time on the horizontal axis and amplitude on the vertical axis showing position signals of the motor used in the AFS system shown in FIG. 1.

FIG. 3 is a graph with time on the horizontal axis and amplitude on the vertical axis showing the three position signals for the coils H1, H2 and H3 relative to an actuator incremental position pulse Ps. This graph is for an 8-pole motor where 60° electrical equals 15° mechanical and the actuator output angle is equal to the motor angle/gear ratio. In an exemplary actuator with a motor shaft to output shaft gear ratio of 50, the incremental resolution of the actuator output is equal to 15°/50=0.3° mechanical.

FIGS. 4a-4d are flow chart diagrams showing a control process for the PID controller 24 that selects and initiates the hold mode, the PID mode and the angle step mode discussed above. For a flow chart diagram 40 shown in FIG. 4a, the algorithm initializes the motor position and the PWM duty cycle to the controller and driver circuit 14 at box 42. The algorithm then reads the position of the motor 12 as $\theta_m$ from the position signals H1, H2 and H3 and the position counter 22 and the motor position command signal $\theta^*_m$ from the motor position command processor 26 at box 44. In an alternate embodiment, the algorithm reads the position of the motor 12 as $\theta_m$ directly from a high resolution encoder sensor. The algorithm then generates a position error signal $\theta_e$ as the difference between the position signal $\theta_m$ and the command signal $\theta^*_m$ at box 46.

The algorithm then determines whether the commutation flag is in the PID mode at decision diamond 48, and if so, determines whether the absolute value of the position error signal $\theta_e$ is less than a first threshold $\theta_1$ at box 50. If the position error $\theta_e$ is less than the first threshold $\theta_1$, then the algorithm sets a commutation flag to a hold mode and the conduction mode to 2-phase at box 52. The algorithm sets the PWM duty cycle signal to $D_{hold}$ and selects the hold phase based on the motor position that is sent to the driver circuit 14 so that the motor 12 is held in its current position. The algorithm then sets the PWM duty cycle to the output at box 120. The algorithm then runs through a diagnostics check at box 54 and goes back to reading the motor position command signal $\theta^*_m$ and the actual motor position signal $\theta_m$ of the motor 12 at the box 44.

If the algorithm determines that the absolute value of the position error signal $\theta_e$ is greater than the first threshold $\theta_1$ at the decision diamond 50, then the algorithm sets the commutation flag to PID control for the normal mode of operation at box 56.

Figure 4A:
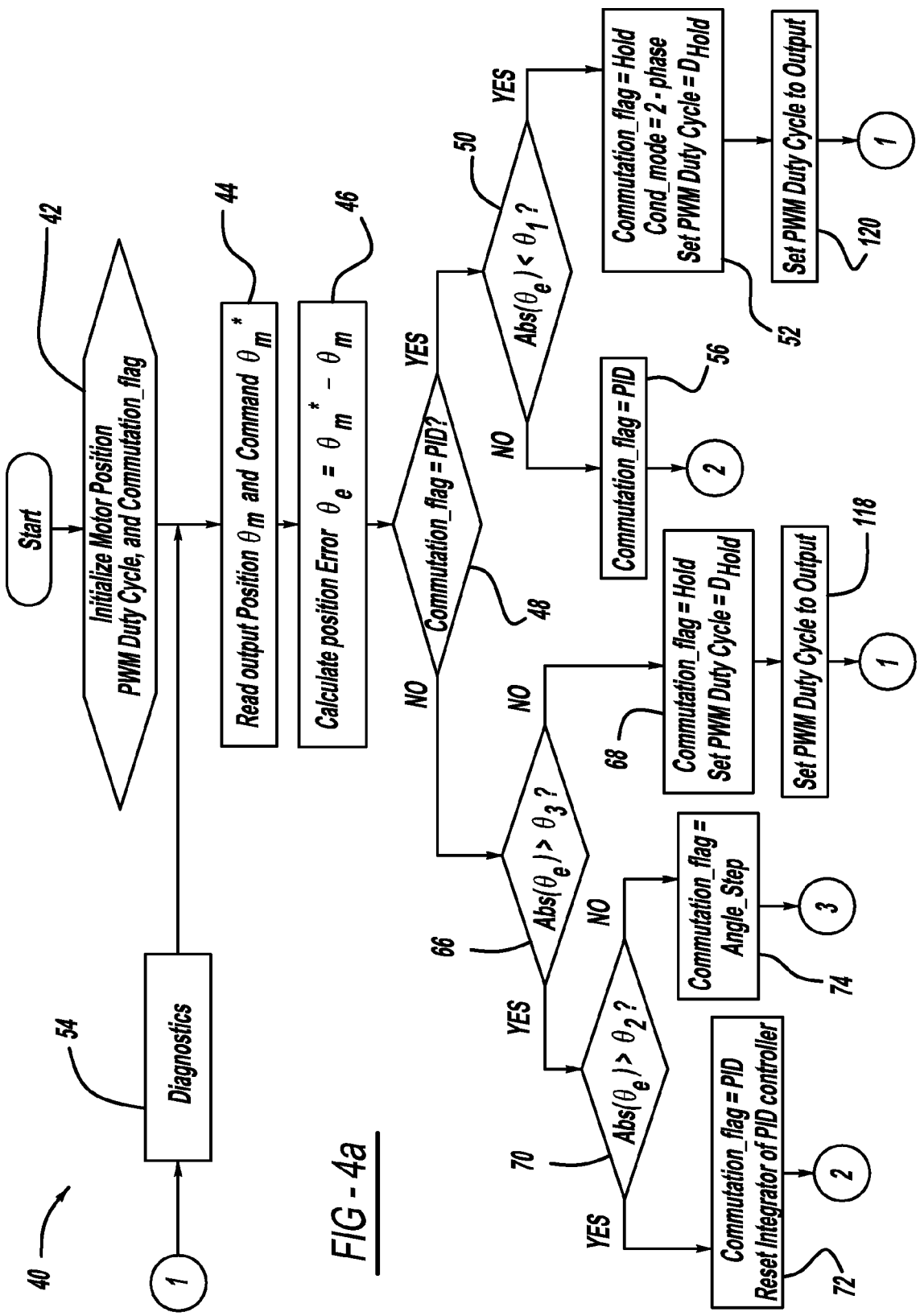
FIGS. 4a-4d are flow chart diagrams showing a method for controlling a motor in the AFS system shown in FIG. 1, according to an embodiment of the present invention.
Figure 4B:
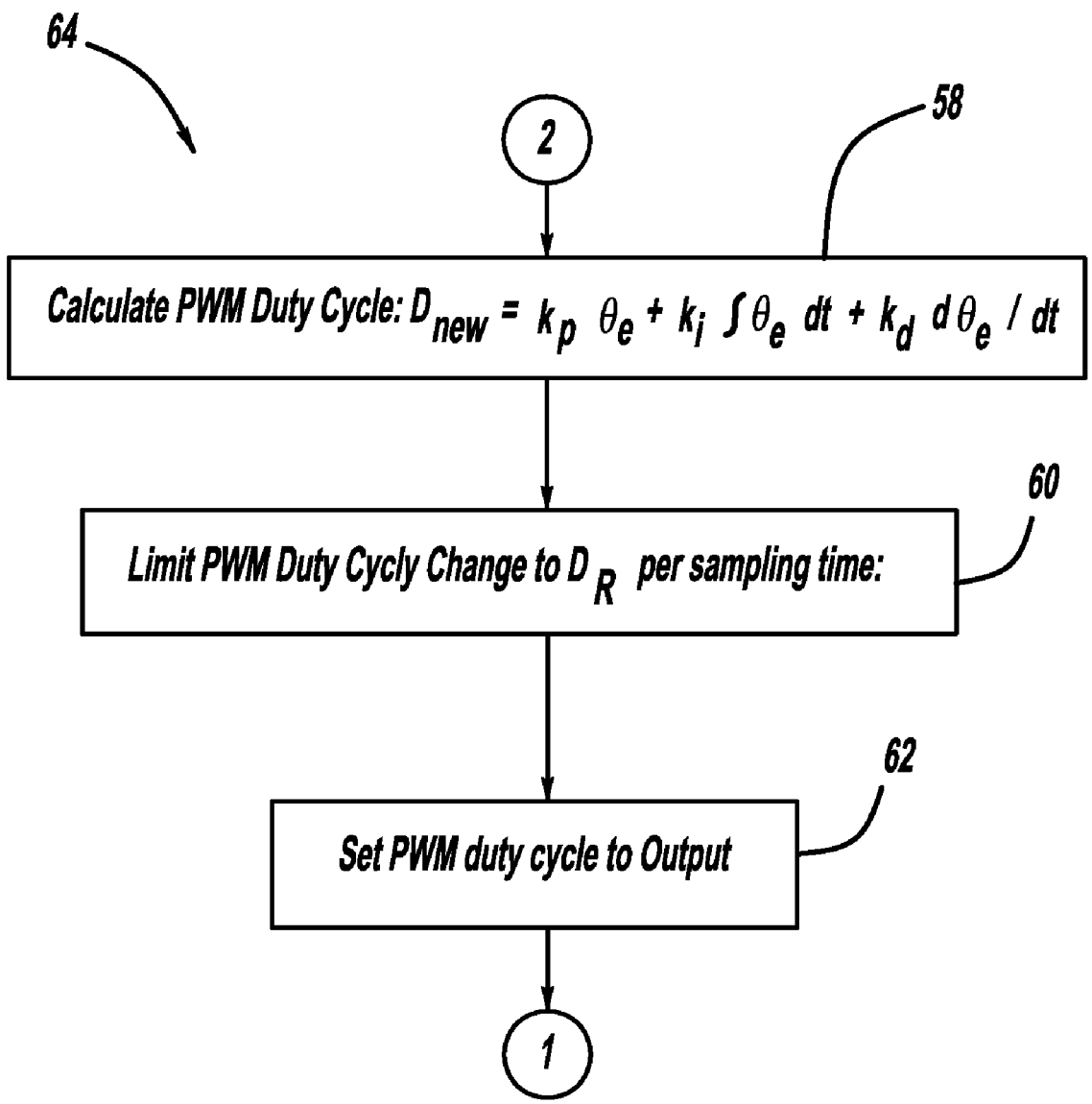

The algorithm then goes through the process of determining a new PWM duty cycle signal $D_{new}$ to rotate the motor 12 as commanded at box 58 in a flow chart diagram 64 in FIG. 4b. The PID controller 24 can calculate the PWM duty cycle signal, preferably, but not limited to, a percent duty cycle, as:

$$D_{new} = k_p \theta_e + k_i \int \theta_e dt + \frac{k_d d\theta_s}{dt}$$

Where $k_p$ is the proportional gain for the PID controller 24, $k_i$ is the integral gain for the PID controller 24 and $k_d$ is the derivative gain for the PID controller 24.

In one embodiment, the new PWM duty cycle signal $D_{new}$ is rate limited to provide a new rate limited signal at box 60 by the rate limiter 32. The rate limiter 32 limits the rate of change of the new PWM duty cycle to $D_R$ per sampling time during the transition from the hold mode or angle step mode to PID control. The rate limited PWM duty cycle is then output to the PWM controller 14 at box 62. In an alternate embodiment, the new PWM duty cycle is output directly to the PWM controller 14 without any rate limiting.

If the algorithm determines that the commutation flag is not in the PID mode at decision diamond 48, then it determines whether the absolute value of the position error signal $\theta_e$ is greater than a second larger threshold $\theta_3$ at decision diamond 66. The second threshold $\theta_3$ may be selected to achieve any given design objective. In one non-limiting embodiment, the threshold $\theta_2$ is between 0.3° and 0.75° for an eight-pole motor with a gear reduction of about fifty. If the absolute value of the position error signal $\theta_e$ is less than the second threshold $\theta_3$ at the decision diamond 66, then the algorithm sets the commutation flag to the hold mode at box 68. Also, the algorithm sets the PWM duty cycle signal to $D_{hold}$ and maintains the current hold phase. The algorithm then sets the PWM duty cycle to the output at box 118. The algorithm then runs through the diagnostics check at the box 54 and goes back to reading the motor position command signal $\theta^*_m$ and the actual motor position signal $\theta_m$ of the motor 12 at the box 44.

If the algorithm determines that the position angle error $\theta_e$ is greater than the second threshold $\theta_3$ at the decision diamond 66, then the algorithm determines whether the position angle error $\theta_e$ is greater than a predetermined maximum value $\theta_2$ at the decision diamond 70. If yes, then the algorithm sets the commutation flag to the PID mode at box 72. The algorithm also resets the integrator of the PID controller at the box 72.

The algorithm then goes through the process of determining a new PWM duty cycle signal $D_{new}$ to rotate the motor 12 as commanded in the flow chart diagram 64.

If the algorithm determines that the position angle error $\theta_e$ is less than the predetermined maximum value $\theta_2$ at the decision diamond 70, then the algorithm sets the commutation flag to the angle step mode at box 74.

The discussion so far with respect to the flow chart diagram 40 concerns whether the position error signal $\theta_e$ is less than a lower threshold $\theta_1$, where the motor position is held, or greater than a second higher threshold $\theta_2$, where the motor 12 is controlled normally. These two parts of the control process are the same as in the '876 application referenced above. The present invention adds another control for the situation where the absolute value of the position error signal $\theta_e$ is between the intermediate threshold $\theta_3$ and the maximum threshold $\theta_2$, where the algorithm goes into the angle step mode. If the absolute value of the position error signal $\theta_e$ is not greater than the threshold $\theta_2$ at the decision diamond 70, then the commutation flag is put in the angle step mode at the box 74. According to the invention, the PID controller 24 can follow two courses for the angle step mode of operation.

Figure 4C:
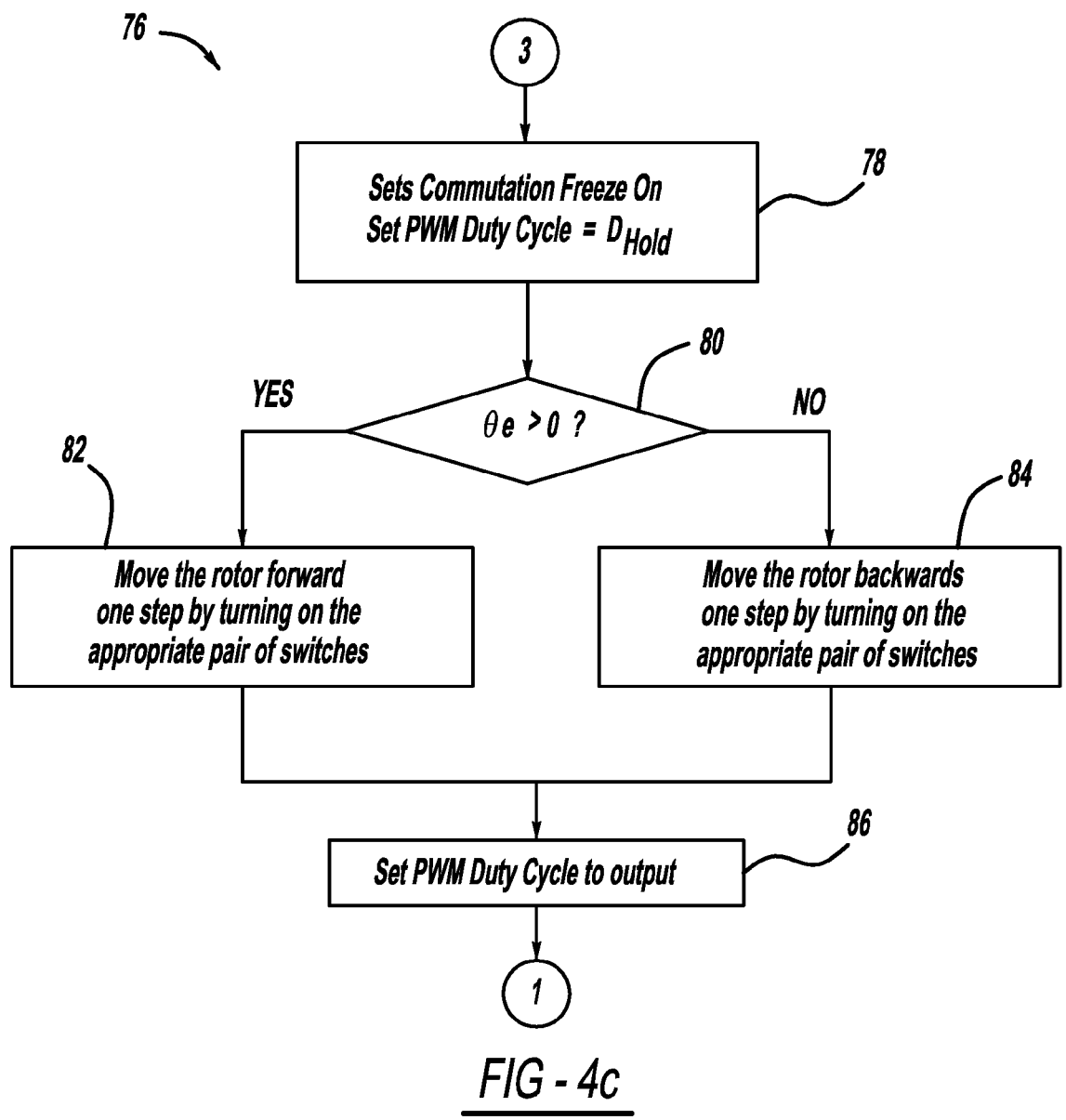

The first angle step control mode is shown by flow chart diagram 76 in FIG. 4c where the PID controller 24 sets the commutation freeze on to hold the position of the motor 12 and sets the PWM duty cycle signal sent to the controller and driver circuit 14 to $D_{hold}$ at box 78 just as was done at the box 52 for the hold mode. The algorithm then determines whether the motor position error $\theta_e$ is greater than zero at decision diamond 80, and if so, increments the hold phase to the driver circuit 14 that rotates the rotor of the motor 12 forward by one step by turning on the appropriate pair of switches 18 depending on the current hold phase at box 82. If the motor position error $\theta_e$ is not greater than zero at the decision diamond 80, then the PID controller 24 provides a signal to rotate the rotor of the motor 12 backward one step by turning on the appropriate pair of the switches 18 depending on the current hold phase at box 84. The algorithm then sets the PWM duty cycle to the output at box 86. The algorithm then returns to the diagnostics box 54.

Figure 4D:
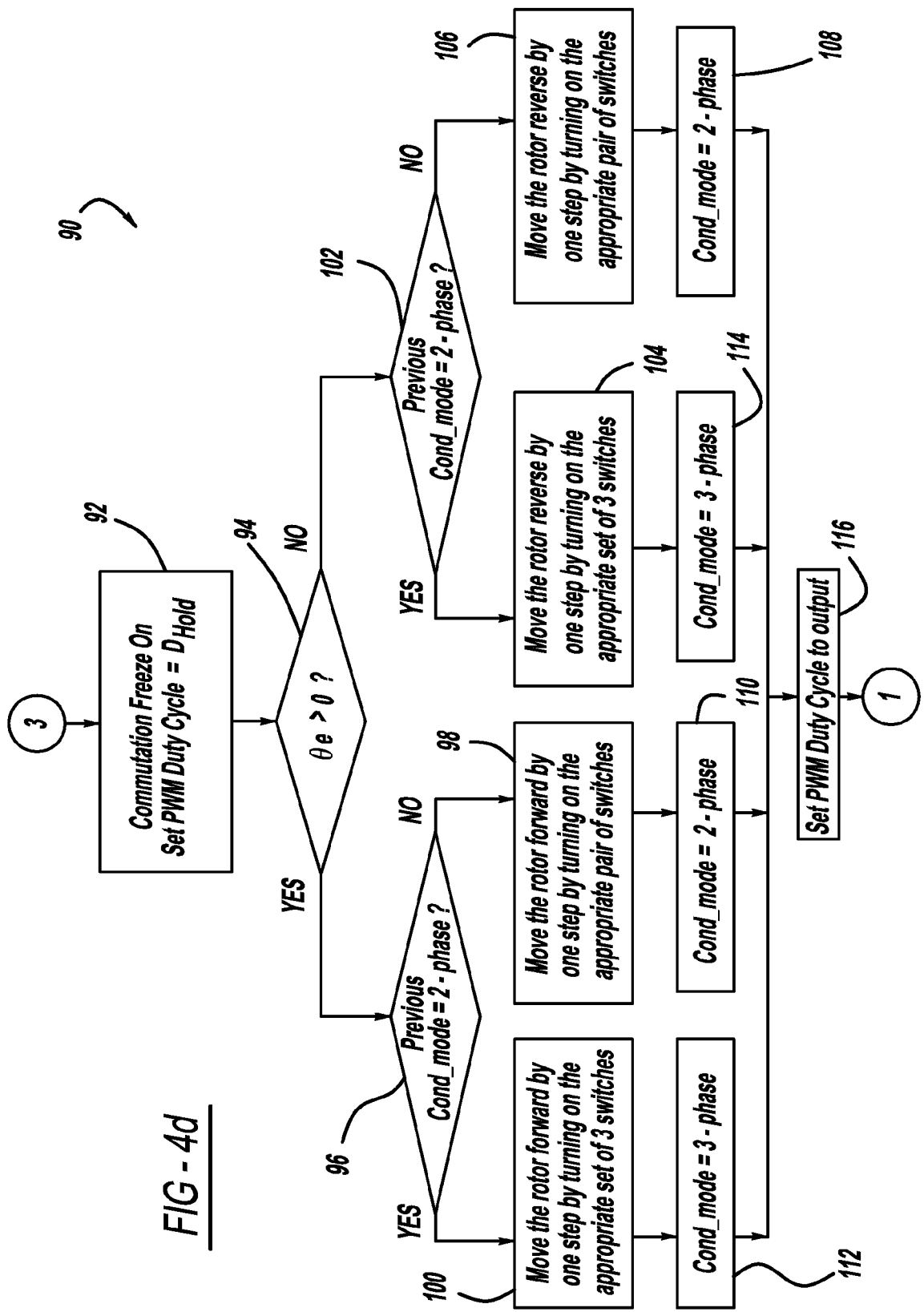

This process for the angle step mode is for the embodiment where the position of the rotor in the motor 12 is controlled by two of the coils in a two-phase process. However, there may be times where all three of the coils in the motor 12 are energized to provide three-phase control. FIG. 4d shows a flow chart diagram 90 for this control mode where three of the coils are used to move the rotor in the angle step commutation process. When two-phases are conducting at a particular time, then the step, either forward or reverse, will be 60° electrical.

Figure 5:
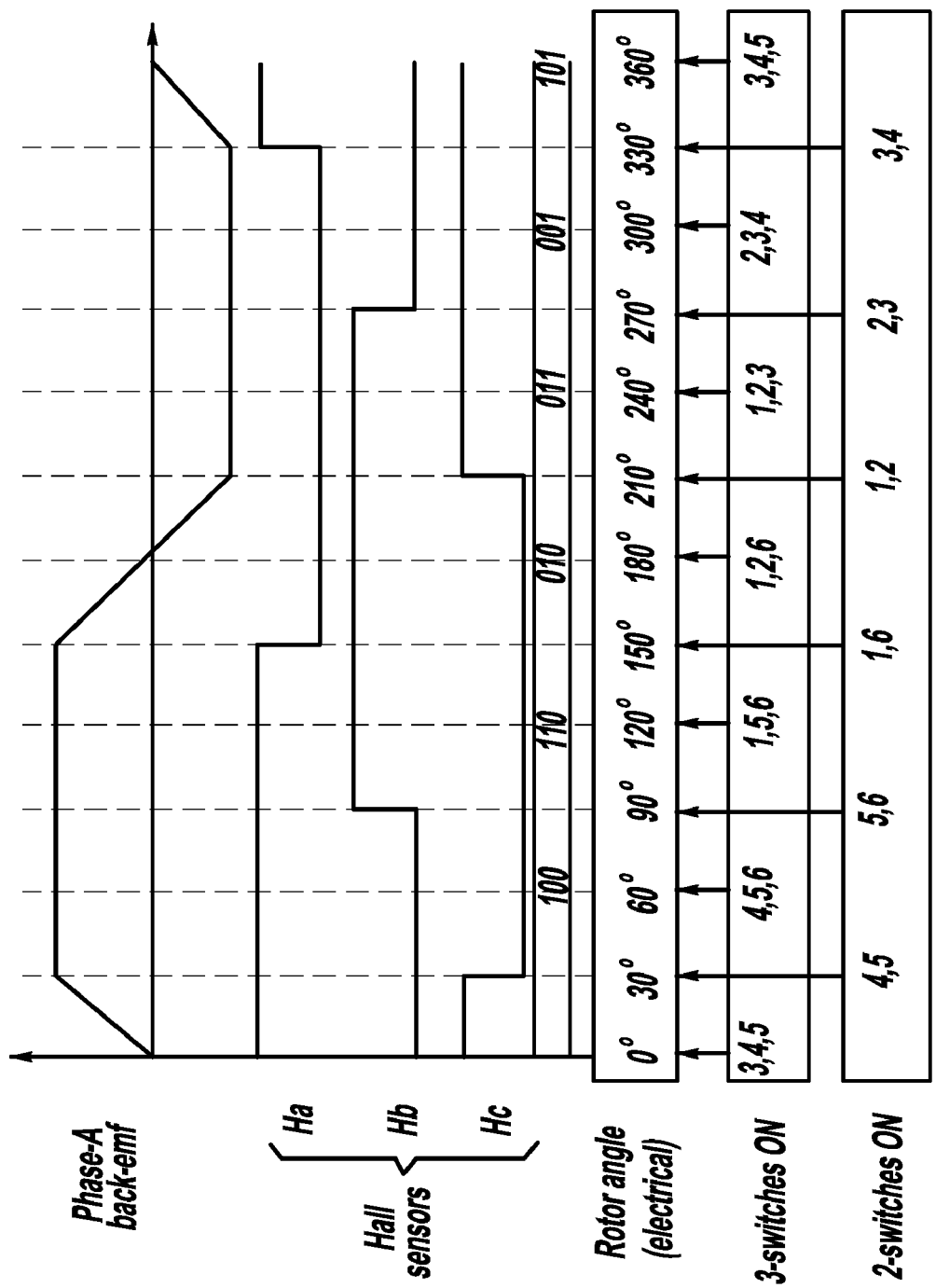
FIG. 5 is a graph showing motor phase alignment during a two-phase hold mode and a three-phase hold mode.

If three-phases are conducting at the same time, then the step of the rotor in the motor 12 will also be 60° electrical, but shifted by 30° electrical from the two-phase hold positions. By utilizing both two and three phases hold modes, it is possible to step the motor in increments of 30° electrical. FIG. 5 is a graph showing motor phase alignment during the hold mode for both the two-phase step control and the three-phase step control.

At box 92, the algorithm sets the commutation freeze on and sets the PWM duty cycle signal to the driver circuit 14 to $D_{hold}$. The algorithm then determines whether the PWM duty cycle motor position error $\theta_e$ is greater than zero at decision diamond 94, and if so, determines whether the previous conduction mode flag is 2-phase at decision diamond 96. If the previous conduction mode is 2-phase at the decision diamond 96, then the signal sent to the driver circuit 14 rotates the rotor of the motor 12 forward one step by turning on the appropriate set of three switches 18 at box 100 and sets the conduction mode flag to 3-phase at box 112. If the previous conduction mode flag is not 2-phase, the controller 24 sends a signal to the driver circuit 14 to rotate the rotor of the motor 12 forward one step by turning on the appropriate pair of switches 18 at box 98 and sets the conduction mode flag to 2-phase at box 110.

If the PWM duty cycle motor position error $\theta_e$ is less than zero at the decision diamond 94, then the algorithm determines whether the previous conduction mode flag is 2-phase at decision diamond 102. If the previous conduction mode is 2-phase at the decision diamond 102, the controller 24 sends a signal to the driver circuit 14 to rotate the rotor of the motor 12 backward one step by turning on the appropriate set of three switches 18 at box 104 and sets the conduction mode flag to 3-phase at box 114. If the conduction mode flag is not 2-phase at the decision diamond 102, the controller 24 sends a signal to the driver circuit 14 to rotate the rotor of the motor 12 backward one step by turning on the appropriate pair of switches 18 at box 106 and sets the conduction mode flag to 2-phase at box 108. The algorithm then sets the PWM duty cycle to the output at box 116. The algorithm then goes to the diagnostics box 54.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling an electric motor that includes a plurality of coils providing phases of the motor, said method comprising:
    providing actual position signals indicative of the actual position of the motor;
    providing a commanded position signal of a desired position of the motor;
    determining a position error signal between the commanded position signal and the actual position signals;
    operating the electric motor in a commutation hold mode when the absolute value of the position error signal is less than a first predetermined threshold by sending signals to coils of the motor to prevent the motor from rotating;
    operating the electric motor in a commutation normal mode when the absolute value of the position error signal is greater than a second predetermined threshold that is greater than the first predetermined threshold; and
    operating the electric motor in an angle step mode if the position error signal is between an intermediate threshold and the second threshold where the angle step mode provides a signal to the motor to move the motor forward or backward a predetermined number of motor steps.

2. The method according to claim 1 wherein operating the electric motor in a commutation normal mode includes providing a controlled duty cycle pulse-width modulation signal that causes the motor to rotate.

3. The method according to claim 2 further comprising rate limiting the duty cycle of the pulse-width modulation signal when the electric motor is being operated in the commutation normal mode.

4. The method according to claim 1 wherein the electric motor is a three-phase electric motor.

5. The method according to claim 4 wherein operating the electric motor in an angle step mode includes controlling the electric motor using two of the phases of the electric motor or using three of the phases of the electric motor.

6. The method according to claim 5 wherein operating the electric motor in an angle step mode includes toggling between the two-phase control and the three-phase control.

7. The method according to claim 1 wherein providing actual position signals includes providing actual position signals that are spaced apart 60° electrical or 120° electrical.

8. The method according to claim 1 wherein operating the electric motor includes controlling the electric motor with a proportional-integral-derivative controller to generate a PWM duty cycle.

9. The method according to claim 1 wherein the electric motor is part of an active front steering system for a vehicle.

10. A method for controlling a DC brushless electric motor that includes three coils providing three phases of the motor, said method comprising:
    providing three actual position signals indicative of the actual position of the phases of the motor with respect to a motor rotor;
    providing a commanded position signal of a desired position of the motor;
    determining a position error signal between the commanded position signal and the actual position signals;
    operating the electric motor in a commutation freeze mode when the absolute value of the position error signal is less than a first predetermined threshold by sending pulse-width modulated voltage signals to coils of the motor to prevent the motor from rotating;
    operating the electric motor in a commutation normal mode when the absolute value of the position error signal is greater than a second predetermined threshold that is greater than the first predetermined threshold by sending pulse-width modulated voltage signals to coils of the motor; and
    operating the electric motor in an angle step mode if the position error signal is between an intermediate threshold and the second threshold where the angle step mode provides a signal to the motor to move the motor forward or backward a predetermined number of motor steps.

11. The method according to claim 10 further comprising rate limiting the duty cycle of the pulse-width modulation signal when the electric motor is being operated in the commutation normal mode.

12. The method according to claim 10 wherein operating the electric motor in an angle step mode includes controlling the electric motor using two of the phases of the electric motor or using three of the phases of the electric motor.

13. The method according to claim 12 wherein operating the electric motor in an angle step mode includes toggling between the two-phase control and the three-phase control.

14. The method according to claim 10 wherein providing actual position signals includes providing actual position signals that are spaced apart 60° electrical or 120° electrical.

15. The method according to claim 10 wherein the electric motor is part of an active front steering system for a vehicle.

16. A method for controlling an electric motor that includes a plurality of coils providing phases of the motor, said method comprising:

providing actual position signals indicative of the actual position of the motor;

providing a commanded position signal of a desired position of the motor;

determining a position error signal between the commuted position signal and the actual position signals; and operating the electric motor in an angle step mode if the position error signal is between an intermediate threshold and a second threshold where the angle step mode provides a signal to the motor to move the motor forward or backward a predetermined number of motor steps.

17. The method according to claim 16 wherein the electric motor is a three-phase brushless DC electric motor.

18. The method according to claim 17 wherein operating the electric motor in an angle step mode includes controlling the electric motor using two of the phases of the electric motor.

19. The method according to claim 17 wherein operating the electric motor in an angle step mode includes controlling the electric motor using three of the phases of the electric motor.

20. The method according to claim 17 wherein operating the electric motor in an angle step mode includes toggling the control of the electric motor between a two-phase control and a three-phase control.

\* \* \* \* \*